(12) United States Patent
Fechner et al.

(10) Patent No.: US 8,221,538 B2
(45) Date of Patent: Jul. 17, 2012

(54) AQUEOUS PIGMENT PREPARATIONS HAVING NONIONIC ADDITIVES ON THE BASIS OF ALYL AND VINYL ETHER

(75) Inventors: Bjoern Fechner, Eppstein (DE); Carsten Schaefer, Muehldorf am Inn (DE); Alexander Woerndle, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 12/674,126

(22) PCT Filed: Jul. 23, 2008

(86) PCT No.: PCT/EP2008/006021
§ 371 (c)(1),
(2), (4) Date: Feb. 18, 2010

(87) PCT Pub. No.: WO2009/024233
PCT Pub. Date: Feb. 26, 2009

(65) Prior Publication Data
US 2011/0185781 A1    Aug. 4, 2011

(30) Foreign Application Priority Data

Aug. 23, 2007 (DE) .................. 10 2007 039 781

(51) Int. Cl.
*C09B 67/00* (2006.01)
*C09B 67/20* (2006.01)
*C09D 17/00* (2006.01)
(52) U.S. Cl. .............. 106/493; 106/15.05; 106/31.58; 106/31.6; 106/31.75; 106/34; 106/272; 106/413; 106/476; 106/494; 106/495; 106/496; 106/497; 106/498; 430/7; 430/108.1; 524/81
(58) Field of Classification Search .......... 106/413, 106/476, 493, 494, 495, 496, 497, 498, 499, 106/15.05, 31.58, 31.6, 31.75, 34, 272; 430/7, 430/108.1; 524/81
See application file for complete search history.

(56) References Cited

U.S. PATENT DOCUMENTS

| | | | | |
|---|---|---|---|---|
| 4,293,475 A | * | 10/1981 | Sidi ............................... | 523/410 |
| 5,157,069 A | * | 10/1992 | Campbell ..................... | 524/500 |
| 5,399,618 A | * | 3/1995 | Jenkins et al. ................ | 524/817 |
| 5,436,292 A | * | 7/1995 | Jenkins et al. ................ | 524/817 |

(Continued)

FOREIGN PATENT DOCUMENTS

| | | |
|---|---|---|
| DE | 102004054034 | 5/2006 |
| EP | 1142972 | 10/2001 |
| EP | 1270624 | 1/2003 |
| WO | WO 93/03099 | 2/1993 |
| WO | WO 95/00565 | 1/1995 |

OTHER PUBLICATIONS

PCT Search Report for PCT/EP2008/006021, mailed Nov. 13, 2008.

(Continued)

*Primary Examiner* — Anthony J Green
(74) *Attorney, Agent, or Firm* — Anthony A. Bisulca

(57) ABSTRACT

The invention relates to an aqueous pigment preparation, containing (A) at least one organic and/or inorganic pigment, (B) a dispersing agent of the formulas (I), (II), (III) or (IV), or mixtures of the dispersing agent of the formulas (I), (II), (III) or (IV), (C) optionally a wetting agent (D) optionally further surfactants and/or dispersing agents, (E) optionally one or multiple organic solvents, or one or multiple hydrotropic substances, (F) optionally further additives common for the production of aqueous pigment dispersions, and (G) water.

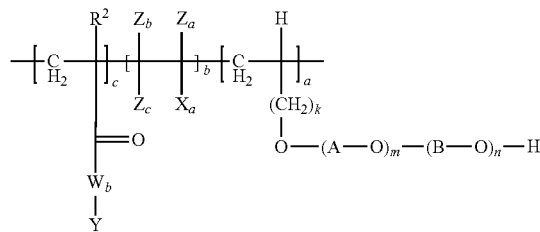

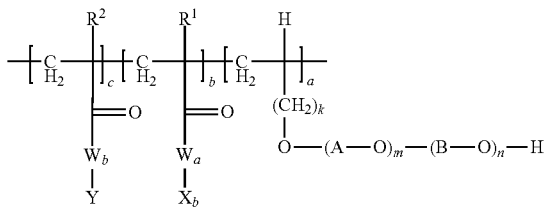

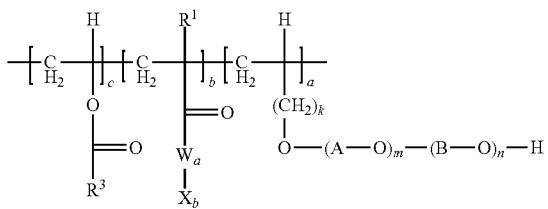

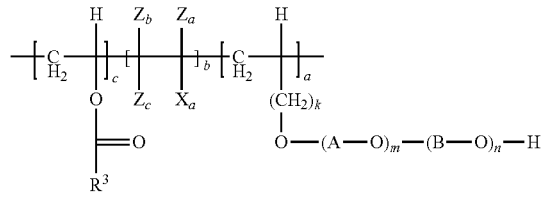

13 Claims, No Drawings

U.S. PATENT DOCUMENTS

| | | |
|---|---|---|
| 5,859,092 A | 1/1999 | Hirasa et al. |
| 6,582,510 B1 * | 6/2003 | Schwartz ............... 106/499 |
| 2002/0019459 A1 * | 2/2002 | Albrecht et al. ......... 523/161 |
| 2003/0144399 A1 * | 7/2003 | Matta et al. ............. 524/419 |
| 2009/0007820 A1 * | 1/2009 | Itoh et al. ............... 106/400 |
| 2009/0095202 A1 | 4/2009 | Fechner et al. |
| 2009/0221739 A1 * | 9/2009 | Knischka et al. ........ 524/505 |
| 2010/0116010 A1 | 5/2010 | Fechner et al. |
| 2010/0137536 A1 | 6/2010 | Fechner et al. |
| 2010/0137537 A1 | 6/2010 | Fechner et al. |
| 2011/0065879 A1 | 3/2011 | Fechner et al. |
| 2011/0107803 A1 | 5/2011 | Fechner et al. |
| 2011/0213094 A1 | 9/2011 | Fechner et al. |
| 2011/0244385 A1 | 10/2011 | Fechner et al. |

OTHER PUBLICATIONS

English abstract for JP 57202311, Dec. 11, 1982.

English Abstract for DE 102004054034, May 11, 2006.

* cited by examiner

AQUEOUS PIGMENT PREPARATIONS HAVING NONIONIC ADDITIVES ON THE BASIS OF ALYL AND VINYL ETHER

The present invention provides aqueous pigment preparations comprising novel nonionic polymers as dispersants and also their use for coloration of natural and synthetic materials.

Dispersing pigments in liquid media typically requires dispersants. Examples of where dispersants are of particular commercial importance are the dispersing of pigments in the manufacture of pigment concentrates (used for coloration of emulsion and varnish colors, paints, coatings and printing inks) and also the coloration of paper, cardboard and textiles.

Pigment preparations comprising ordered polymeric structures are also described in the prior art. Examples thereof are EP 1 293 523, DE 10 2005 012 315 and EP 1 721 941.

The formerly customary novolak dispersants contain as a consequence of their process of production residues of alkylphenols, frequently nonylphenol, and ethoxylates thereof. Since alkylphenol ethoxylates, or their degradation products, scarcely undergo any degradation in the environment, they build up. This is problematic in that they have a hormonal effect on aquatic organisms. Therefore, many countries have adopted legislation (2003/53/EC for example) which limits or bans the use of materials containing alkylphenols or their ethoxylates in open-loop systems.

Studies to date have shown that it is still extremely difficult to synthesize dispersants that are equivalent in performance to nonionic novolak systems. There is accordingly a need for novel dispersants that are capable of dispersing organic pigments in high concentration above 40% to low-viscosity dispersions. These dispersions shall be straightforward to produce; i.e., the pigments shall be readily wetted and be readily incorporated into the aqueous medium. The dispersion shall have a high and reproducible color strength and this shall remain stable for a period of several years. Similarly, all further coloristic parameters such as, for example, hue angle and chroma shall be reproducible and stable. Furthermore, the dispersion shall have a low viscosity; the pigments must neither agglomerate nor flocculate, nor cream up or form a sediment. The dispersion should not foam or cause or speed foaming in the application medium. Furthermore, the dispersants should contribute to broad compatibility of the dispersions in various application media. Moreover, the dispersion shall be shear stable; i.e., its color strength or coloristics must not change under shearing, and the dispersion shall remain resistant to flocculation under these conditions.

It has now been found that, surprisingly, specific nonionic comb copolymers, prepared by means of macromonomers composed of polyethylene/polypropylene glycol monovinyl ethers or monoallyl ethers, achieve this object.

The present invention provides aqueous pigment preparations comprising
(A) at least one organic and/or inorganic pigment,
(B) a dispersant of formula (I), (II), (III) or (IV) or mixtures of dispersants of formulae (I), (II), (III) or (IV)

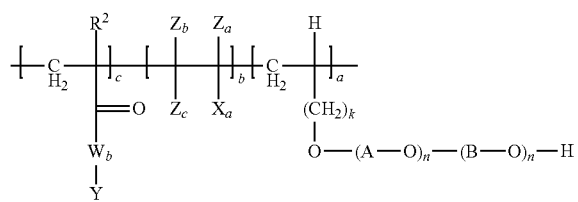

(I)

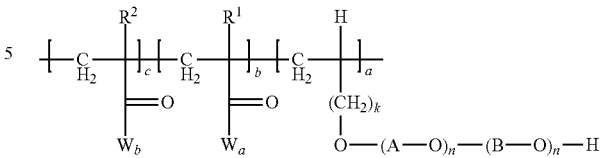

(II)

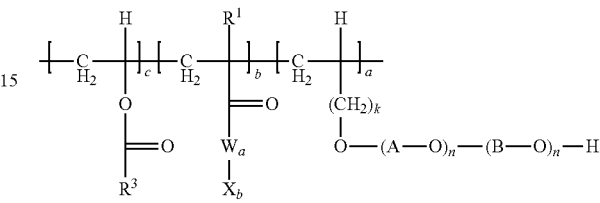

(III)

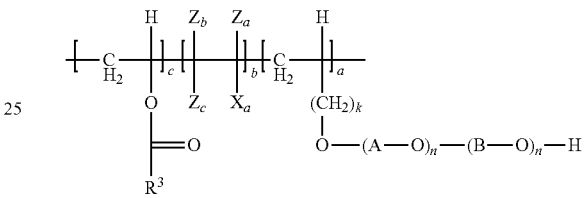

(IV)

where the indices a, b and c indicate the molar fraction of the respective monomers
$a = 0.01$ to $0.8$, preferably $0.1$ to $0.7$;
$b = 0.001$ to $0.8$, preferably $0.1$ to $0.6$;
$c = 0.001$ to $0.8$, preferably $0.1$ to $0.6$;
provided the sum total of $a+b+c$ is 1,
A represents $C_2$- to $C_4$-alkylene and
B represents a $C_2$- to $C_4$-alkylene other than A,
k equals 0 or 1,
m is from 0 to 500, preferably from 0 to 50;
n is from 0 to 500, preferably from 0 to 50,
provided the sum total of $m+n$ is from 1 to 1000;
$X_a$ represents an aromatic or araliphatic radical having 3 to 30 carbon atoms which optionally contains one or more of the hetero atoms N, O and S,
$Z_a$ represents H or $(C_1$-$C_4)$-alkyl,
$Z_b$ represents H or $(C_1$-$C_4)$-alkyl,
$Z_c$ represents H or $(C_1$-$C_4)$-alkyl;
$R^1$ represents hydrogen or methyl,
$X_b$ represents an aromatic or araliphatic radical having 3 to 30 carbon atoms which optionally contains one or more of the hetero atoms N, O and S,
$W_a$ represents oxygen or an NH group,
$R^2$ represents hydrogen or methyl,
Y represents an aliphatic hydrocarbyl radical having 1 to 30 carbon atoms, preferably 6 to 30, particularly 9 to 20 carbon atoms, which may be linear or branched or else cyclic, and which may contain hetero atoms O, N and/or S and may also be unsaturated,
$W_b$ represents oxygen or an NH group;
(C) optionally wetters,
(D) optionally further surfactants and/or dispersants,
(E) optionally one or more organic solvents and/or one or more hydrotropic substances,
(F) optionally further additive materials customary for preparing aqueous pigment dispersions, and (G) water.

Preferred pigment preparations comprise 5% to 80% by weight, for example 10% to 70% by weight, of component (A).

Preferred pigments preparations comprise 0.1% to 30% by weight, for example 2% to 15% by weight of component (B).

Particularly preferred pigment preparations comprise in terms of component
(A) 5% to 80% by weight, for example 10% to 70% by weight,
(B) 0.1% to 30% by weight, for example 2% to 15% by weight,
(C) 0% to 10% by weight, for example 0.1% to 5% by weight,
(D) 0% to 20% by weight, for example 1% to 10% by weight,
(E) 0% to 30% by weight, for example 5% to 20% by weight,
(F) 0% to 20% by weight, for example 0.1% to 5% by weight,
(G) 1% to 90% by weight of water, for example 10% to 70% by weight,
all based on the total weight (100% by weight) of the pigment preparation.

When one or more of components (C), (D), (E) and (F) are present, their minimum concentrations independently of each other are preferably at least 0.01% by weight and more preferably at least 0.1% by weight, based on the total weight of the pigment preparation.

Component (A) in the pigment preparation of the present invention is a finely divided organic or inorganic pigment or a mixture of various organic and/or inorganic pigments. Component (A) can also be a dye that is soluble in certain solvents and has pigment character in other solvents. The pigments can be used not only in the form of dry powder but also as water-moist presscake.

Useful organic pigments include monoazo, disazo, laked azo, β-naphthol, Naphthol AS, benzimidazolone, disazo condensation, azo metal complex pigments or polycyclic pigments such as, for example, the phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments or carbon blacks.

Of the organic pigments mentioned, those which are in a very fine state of subdivision for producing the preparations are particularly suitable, and preferably 95% and more preferably 99% of the pigment particles have a particle size $\leqq 500$ nm.

An exemplary selection of particularly preferred organic pigments includes carbon black pigments, for example lamp or furnace blacks; monoazo and disazo pigments, in particular the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Yellow 219, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; 3-naphthol and Naphthol AS pigments, in particular the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 256, Pigment Orange 5, Pigment Orange 38 or Pigment Brown 1; laked azo and metal complex pigments, in particular the Colour Index pigments Pigment Red 48:2, Pigment Red 48:3, Pigment Red 48:4, Pigment Red 57:1, Pigment Red 257, Pigment Orange 68 or Pigment Orange 70; benzimidazoline pigments, in particular the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, in particular the Colour Index pigments Pigment Yellow 139 or Pigment Yellow 173; phthalocyanine pigments, in particular the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7 or Pigment Green 36; anthanthrone, anthraquinone, quinacridone, dioxazine, indanthrone, perylene, perinone and thioindigo pigments, in particular the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23 or Pigment Orange 43; triarylcarbonium pigments, in particular the Colour Index pigments Pigment Red 169, Pigment Blue 56 or Pigment Blue 61; diketopyrrolopyrrole pigments, in particular the Colour Index pigments Pigment Red 254, Pigment Red 255, Pigment Red 264, Pigment Red 270, Pigment Red 272, Pigment Orange 71, Pigment Orange 73, Pigment Orange 81.

Laked dyes such as calcium, magnesium and aluminum lakes of sulfonated and/or carboxylated dyes are also suitable.

Suitable inorganic pigments include for example titanium dioxides, zinc sulfides, zinc oxides, iron oxides, magnetites, manganese iron oxides, chromium oxides, ultramarine, nickel or chromium antimony titanium oxides, manganese titanium rutiles, cobalt oxides, mixed oxides of cobalt and of aluminum, rutile mixed phase pigments, sulfides of the rare earths, spinets of cobalt with nickel and zinc, spinets based on iron and chromium with copper zinc and also manganese, bismuth vanadates and also blend pigments. The Colour Index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33 and also Pigment White 6 are used in particular. Preference is frequently also given to using mixtures of inorganic pigments. Mixtures of organic with inorganic pigments are likewise often used.

Instead of pigment dispersions it is also possible to prepare dispersions of solids including for example natural finely divided ores, minerals, sparingly soluble or insoluble salts, particles of wax or plastic, dyes, crop protection and pest control agents, UV absorbers, optical brighteners and polymerization stabilizers.

The copolymers (component B) have a molecular weight of $10^3$ g/mol to $10^9$ g/mol, more preferably of $10^3$ to $10^7$ g/mol and even more preferably $10^3$ to $10^5$ g/mol. These polymers may be prepared by free-radical polymerization of monomers corresponding to the radicals in formula (I), (II), (III) or (IV) which are described in the parentheses $[\ ]_c$, $[\ ]_b$ and $[\ ]_a$. The conditions for performing the free-radical polymerization are known to those skilled in the art.

Preferred monomers of group [ ]$_a$ are those in which A is ethylene and B is propylene, or A is propylene and B is ethylene.

The alkylene oxide units (A-O)$_m$ and (B—O)$_n$ can be present either in a random arrangement or, as in the case of a preferred embodiment, in a blocklike arrangement.

The sum total of the alkylene oxide units can in principle be n+m=1 to 1000, although 1 to 500 is preferred, 2 to 100 is particularly preferred and 5 to 100 is even more particularly preferred.

The monomers of group [ ]$_b$ include for example the following esters and amides of acrylic acid and methacrylic acid: phenyl, benzyl, tolyl, 2-phenoxyethyl, phenethyl.

Monomers of group [ ]$_b$ further include vinylaromatic monomers such as styrene and its derivatives, such as vinyltoluene and α-methylstyrene for example. The aromatic unit may also comprise heteroaromatics, as in 1-vinylimidazole for example.

Particularly preferred monomers of group [ ]$_b$ can be: styrene, 1-vinylimidazole, benzyl methacrylate, 2-phenoxyethyl methacrylate and phenethyl methacrylate.

The monomers of group [ ]$_c$ include for example the following esters and amides of acrylic acid and methacrylic acid: methyl, ethyl, propyl, isopropyl, n-butyl, isobutyl, t-butyl, pentyl, hexyl, 2-ethylhexyl, 3,3-dimethylbutyl, heptyl, octyl, isooctyl, nonyl, lauryl, cetyl, stearyl, behenyl, cyclohexyl, trimethylcyclohexyl, t-butylcyclohexyl, bornyl, isobornyl, adamantyl, (2,2-dimethyl-1-methyl)propyl, cyclopentyl, 4-ethyl-cyclohexyl, 2-ethoxyethyl, tetrahydrofurfuryl and tetrahydropyranyl.

The monomers of group [ ]$_c$ further include the vinyl esters of carboxylic acids, such as for example vinyl laurate, vinyl myristate, vinyl stearate, vinyl behenate, vinyl pivalate, vinyl neohexanoate, vinyl neoheptanoate, vinyl neooctanoate, vinyl neononanoate and vinyl neodecanoate. The vinyl esters of mixtures of such carboxylic acids can likewise be used here.

Preferred monomers of group [ ]$_c$ are the following alkyl esters and alkylamides of acrylic acid and methacrylic acid: methyl, ethyl, propyl, butyl, isobutyl, 2-ethoxyethyl, myristyl, octadecyl, more preferably 2-ethylhexyl and lauryl.

Component (C) generally comprises cationic, anionic, amphoteric or nonionic compounds which enhance pigment wetting (wetting agents, wetters), for example, alkyl sulfates such as, for example, lauryl sulfate, alkylbenzene sulfonic acid, short-chain alkoxylation products such as, for example, lauryl alcohol reacted with approximately 5 mol of ethylene oxide or alkynediols.

Component (D) in the pigment preparations of the present invention comprises customary dispersants and surfactants useful for preparing aqueous pigment dispersions, or mixtures thereof. Anionic, cationic, amphoteric or nonionic surface-active compounds are typically used, as described in DE-A-10 2007 021 870.

Component (E) comprises organic solvents or water-soluble hydrotropic substances. Hydrotropic compounds, which also serve as a solvent, if appropriate, or are oligomeric or polymeric in nature are for example formamide, urea, tetra-methylurea, ε-caprolactam, ethylene glycol, propylene glycol, diethylene glycol, triethylene glycol, polyethylene glycol, α-methyl ω-hydroxy polyethylene glycol ether, dimethyl polyethylene glycol ether, dipropylene glycol, polypropylene glycol, dimethyl polypropylene glycol ether, copolymers of ethylene glycol and propylene glycol, butyl glycol, methylcellulose, glycerol, diglycerol, polyglycerol, N-methyl-pyrrolidone, 1,3-diethyl-2-imidazolidinone, thiodiglycol, sodium benzenesulfonate, sodium xylenesulfonate, sodium toluenesulfonate, sodium cumenesulfonate, sodium dodecylsulfonate, sodium benzoate, sodium salicylate, sodium butyl monoglycol sulfate, cellulose derivatives, gelatin derivatives, polyvinylpyrrolidone, polyvinyl alcohol, polyvinylimidazole and co- and terpolymers of vinylpyrrolidone, vinyl acetate and vinylimidazole. Polymers comprising vinyl acetate building blocks may subsequently be saponified to the vinyl alcohol.

Component (F) comprises for example thickeners, preservatives, viscosity stabilizers, grinding assistants and fillers. Further customary additives are antisettling agents, photoprotectants, antioxidants, degassers/defilmers, foam-reducing agents, anticaking agents and also viscosity and rheology improvers. Useful viscosity regulators include for example polyvinyl alcohol and cellulose derivatives. Water-soluble natural or manufactured resins and also polymers may similarly be included as filming or binding agents to enhance bonding strength and abrasion resistance. Useful pH regulators include organic or inorganic bases and acids. Preferred organic bases are amines, for example ethanolamine, diethanolamine, triethanolamine, N,N-dimethylethanolamine, diisopropylamine, aminomethylpropanol or dimethylaminomethylpropanol. Preferred inorganic bases are sodium hydroxide, potassium hydroxide, lithium hydroxide or ammonia. Component (F) further comprises fats and oils of vegetable and animal origin, for example beef tallow, palm kernel fat, coconut fat, rapeseed oil, sunflower oil, linseed oil, palm oil, soy oil, groundnut oil and whale oil, cotton seed oil, maize oil, poppy seed oil, olive oil, castor oil, colza oil, safflower oil, soybean oil, thistle oil, sunflower oil, herring oil, sardine oil. Common additives also include saturated and unsaturated higher fatty acids, for example palmitic acid, cyprylic acid, capric acid, myristic acid, lauric acid, stearic acid, oleic acid, linoleic acid, linolenic acid, caproic acid, caprylic acid, arachidic acid, behenic acid, palmitoleic acid, gadoleic acid, erucic acid and ricinoleic acid, and also salts thereof.

Water used as component (G) to produce the pigment preparations is preferably used in the form of demineralized or distilled water. It is similarly possible to use drinking water (tap water) and/or water of natural origin.

The present invention also provides a process for producing the pigment preparations of the present invention, which process comprises dispersing said component (A) in the form of powder, granulate or aqueous presscake in the presence of water (G) and also said components (B) and optionally (C) and (D), then optionally admixing water (G) and also optionally one or more of said components (E) and (F) and optionally diluting the resulting aqueous pigment dispersion with water (G). Said components (B) and optionally one or more of said components (C), (D), (E) and (F) are preferably initially mixed and homogenized, then said component (A) is stirred into the initially charged mixture, said component (A) being incipiently pasted and predispersed. The predispersion is subsequently, depending on the texture of component (A), finely dispersed or finely dissipated, with or without cooling, using a grinding or dispersing assembly. Such may include stirrers, dissolvers (sawtooth stirrers), rotor-stator mills, ball mills, stirred media mills such as sand and bead mills, high speed mixers, kneaders, roll stands or high performance bead mills. The fine dispersing or grinding of component (A) is carried on to the desired particle size distribution and can take place at temperatures in the range from 0 to 100° C., advantageously at a temperature between 10 and 70° C., preferably at 20 to 60° C. Following the fine-dispersing operation, the pigment preparation may be further diluted with water (G), preferably deionized or distilled water.

The pigment preparations of the present invention are useful for pigmentation and coloration of natural and synthetic materials of any kind, particularly of aqueous paints, emulsion and varnish colors (emulsion varnishes).

The pigment preparations of the present invention are further useful for coloration of macromolecular materials of any kind, for example of natural and synthetic fiber materials, preferably cellulose fibers, and also for paper pulp coloration and for laminate coloration. Further uses are the production of printing colors, for example textile printing colors, flexographic printing inks, decorative printing inks or intaglio printing inks, wallpaper colors, water-thinnable coatings, wood preservation systems, viscose dope dyeing systems, varnishes, including powder coatings, sausage casings, seed, fertilizers, glass, particularly glass bottles, and also of mass coloration of roof shingles, for coloration of renders, concrete, wood stains, colored pencil leads, felt tip pens, waxes, paraffins, graphics inks, ball point pen pastes, chalks, washing and cleaning compositions, shoe care agents, latex products, abrasives, and also for coloration of plastics or high molecular weight materials of any kind. Examples of high molecular weight organic materials are cellulose ethers and esters, such as ethylcellulose, nitrocellulose, cellulose acetate or cellulose butyrate, natural resins or synthetic resins, such as addition polymerization resins or condensation resins, for example amino resins, particularly urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, lattices, silicone, silicone resins, individually or in admixture.

The pigment preparations of the present invention are further useful for producing liquid printing inks for use in all conventional ink-jet printers, particularly for those based on the bubble jet or piezo process. These liquid printing inks can be used to print paper and also natural or synthetic fiber materials, foils and plastics.

Additionally, the pigment preparations of the present invention can be used for printing various kinds of coated or uncoated substrate materials, for example for printing paper board, cardboard, wood and woodbase materials, metallic materials, semiconductor materials, ceramic materials, glasses, glass and ceramic fibers, inorganic materials of construction, concrete, leather, comestibles, cosmetics, skin and hair. The substrate material may be two-dimensionally planar or spatially extended, i.e., three-dimensionally configured, and may be printed or coated completely or only in parts.

The pigment preparations of the present invention are also useful as a colorant in electrophotographic toners and developers, for example in one- or two-component powder toners (also called one- or two-component developers), magnet toners, liquid toners, latex toners, polymerization toners and also specialty toners.

The pigment preparations of the present invention are also useful as a colorant in liquid inks, preferably ink-jet inks, for example aqueous or nonaqueous (solvent based), microemulsion inks, UV-curable inks, and also in such inks that operate according to the hot melt process.

The pigment preparations of the present invention can also be used as colorants for color filters for flat panels displays, not only for additive but also for subtractive color production, also for photoresists and also as colorants for "electronic inks" or "e-inks" or "electronic paper" or "e-paper".

EXAMPLES

Preparation of Dispersants (B)

Synthesis Prescription 1

A flask equipped with stirrer, reflux condenser, internal thermometer and nitrogen inlet was initially charged with monomer A, monomer C and, where appropriate, the molecular weight regulator in solvent under nitrogen.

Then, the temperature was raised to 80° C. with stirring and a solution of the initiator was added during one hour by metering. At the same time, the metered addition was commenced of monomer B, and it was concluded after 3 hours. The batch was subsequently further stirred at this temperature for 2 hours, and then the solvent was removed under reduced pressure.

Synthesis Prescription 2

A flask equipped with stirrer, reflux condenser, internal thermometer and nitrogen inlet was initially charged with monomer A, monomer C and, where appropriate, the molecular weight regulator and component 1 (ascorbic acid) of the redox initiator system in solvent under nitrogen. Then, the temperature was raised to 80° C. with stirring and a solution of component 2 (t-BuOOH) of the redox initiator system was added during three hours with stirring. At the same time the metered addition was commenced of monomer B, and it was concluded after 3 hours. The batch was subsequently further stirred at this temperature for 2 hours, and then the solvent was removed under reduced pressure.

The following three tables contain synthesis examples carried out similarly to the above two general synthesis prescriptions.

AMBN=2,2'-azobis(2-methylbutyronitrile)

TABLE 1

| | | 1 | 2 | 3 | 4 | 5 | 6 | 7 | 8 | 9 | 10 |
|---|---|---|---|---|---|---|---|---|---|---|---|
| Monomer C | 2-ethylhexyl methacrylate | 136.4 g | | | | | | | | | |
| | lauryl methacrylate | | | 175.0 g | | | | | | | |
| | stearyl methacrylate | | | | | 232.8 g | | | | | |
| | isobornyl methacrylate | | | | | | | 152.9 g | | | |
| | tetrahydrofurfuryl methacrylate | | | | | | | | | 117.1 g | |
| | vinyl neononanoate | | | | 78.3 g | | | | | | 78.3 g |
| | vinyl neodecanoate | | 84.3 g | | | | | | 84.3 g | | |
| | vinyl neoundecanoate | | | | | | 90.3 g | | | | |

TABLE 1-continued

|  |  | 1 | 2 | 3 | 4 | 5 | 6 | 7 | 8 | 9 | 10 |
|---|---|---|---|---|---|---|---|---|---|---|---|
| Monomer B | 1-vinylimidazole |  |  |  |  | 64.7 g |  | 64.7 g |  |  |  |
|  | styrene | 71.6 g | 41.6 g |  | 41.6 g |  |  |  |  |  | 41.6 g |
|  | benzyl methacrylate |  |  |  |  |  | 70.4 g |  | 70.4 g |  |  |
|  | phenethyl methacrylate |  |  | 130.8 g |  |  |  |  |  |  |  |
|  | 2-phenoxyethyl methacrylate |  |  |  |  |  |  |  |  | 141.8 g |  |
| Monomer A | polyglcyol 1 |  | 300 g |  | 300 g |  | 300 g |  |  | 300 g |  |
|  | polyglycol 2 | 378.4 g |  | 378.4 g |  | 378.4 g |  |  |  | 378.4 g |  |
|  | polyglycol 3 |  |  |  |  |  |  | 688 g |  |  |  |
|  | polyglycol 4 |  |  |  |  |  |  |  | 3000 g |  |  |
| Initiator | AMBN | 16.5 g | 13.4 g |  | 13.4 g | 16.5 g | 13.4 g | 16.5 g | 13.4 g |  |  |
|  | dibenzoyl peroxide |  |  | 20.8 g |  |  |  |  |  |  |  |
|  | ascorbic acid/t-BuOOH |  |  |  |  |  |  |  |  | 17.51 g/ 7.73 g | 17.51 g/ 7.73 g |
| Regulator | dodecanethiol | 16.5 g |  | 16.5 g |  | 16.5 g |  | 16.5 g |  | 16.5 g | 13.4 g |
|  | ethyl mercaptan |  |  |  | 4.2 g |  |  |  |  |  |  |
| Solvent | methyl ethyl ketone | 660 g | 660 g |  |  | 660 g |  |  | 660 g | 660 g | 660 g |
|  | methyl isobutyl ketone |  |  | 660 g | 660 g |  |  |  |  |  |  |
|  | isopropanol |  |  |  |  |  | 660 g | 660 g |  |  |  |
|  | to synthesis prescription ... | 1 | 1 | 1 | 1 | 1 | 1 | 1 | 1 | 2 | 2 |
|  | $M_w$ of polymer obtained | 14000 | 18500 | 10300 | 9000 | 12800 | 17900 | 15400 | 26200 | 11000 | 8800 |

TABLE 2

|  |  | 11 | 12 | 13 | 14 | 15 | 16 | 17 | 18 | 19 | 20 |
|---|---|---|---|---|---|---|---|---|---|---|---|
| Monomer C | 2-ethylhexyl methacrylate | 136.4 g |  |  |  |  |  |  |  |  |  |
|  | lauryl methacrylate |  |  | 175.0 g |  |  |  |  |  |  |  |
|  | stearyl methacrylate |  |  |  |  | 232.8 g |  |  |  |  |  |
|  | isobornyl methacrylate |  |  |  |  |  |  | 152.9 g |  |  |  |
|  | tetrahydrofurfuryl methacrylate |  |  |  |  |  |  |  |  | 117.1 g |  |
|  | vinyl neononanoate |  |  |  | 78.3 g |  |  |  |  |  | 78.3 g |
|  | vinyl neodecanoate |  | 84.3 g |  |  |  |  |  | 84.3 g |  |  |
|  | vinyl neoundecanoate |  |  |  |  |  | 90.3 g |  |  |  |  |
| Monomer B | 1-vinylimidazole |  |  |  |  | 64.7 g |  | 64.7 g |  |  |  |
|  | styrene | 71.6 g | 41.6 g |  | 41.6 g |  |  |  |  |  | 41.6 g |
|  | benzyl methacrylate |  |  |  |  |  | 70.4 g |  | 70.4 g |  |  |
|  | phenethyl methacrylate |  |  | 130.8 g |  |  |  |  |  |  |  |
|  | 2-phenoxyethyl methacrylate |  |  |  |  |  |  |  |  | 141.8 g |  |
| Monomer A | polyglcyol 5 |  |  |  |  |  |  | 210 g |  |  |  |
|  | polyglycol 6 |  | 300 g |  | 300 g |  |  |  | 300 g |  | 300 g |
|  | polyglycol 7 | 378.4 g |  | 378.4 g |  | 378.4 g |  |  |  | 378.4 g |  |
| Initiator | AMBN | 16.5 g | 13.4 g |  | 13.4 g | 16.5 g | 13.4 g |  | 13.4 g |  |  |
|  | dibenzoyl peroxide |  |  | 20.8 g |  |  |  | 20.8 g |  |  |  |
|  | ascorbic acid/t-BuOOH |  |  |  |  |  |  |  |  | 17.51 g/ 7.73 g | 17.51 g/ 7.73 g |
| Regulator | dodecanethiol |  | 13.4 g | 16.5 g |  |  | 13.4 g | 16.5 g |  |  | 13.4 g |
|  | ethyl mercaptan |  |  |  | 4.2 g |  |  |  | 4.2 g |  |  |
| Solvent | methyl ethyl ketone | 660 g | 660 g |  |  | 660 g | 660 g |  |  | 660 g | 660 g |
|  | methyl isobutyl ketone |  |  | 660 g | 660 g |  |  |  |  |  |  |
|  | isopropanol |  |  |  |  |  |  | 660 g | 660 g |  |  |
|  | to synthesis prescription ... | 1 | 1 | 1 | 1 | 1 | 1 | 1 | 1 | 2 | 2 |
|  | $M_w$ of polymer obtained | 16200 | 7500 | 6100 | 8200 | 14600 | 7000 | 15000 | 8900 | 14700 | 9200 |

TABLE 3

|  |  | 21 | 22 | 23 | 24 | 25 | 26 | 27 | 28 | 29 | 30 |
|---|---|---|---|---|---|---|---|---|---|---|---|
| Monomer C | 2-ethylhexyl methacrylate | 136.4 g |  |  |  |  |  |  |  |  |  |
|  | lauryl methacrylate |  |  | 175.0 g |  |  |  |  |  |  |  |
|  | stearyl methacrylate |  |  |  |  | 232.8 g |  |  |  |  |  |
|  | isobornyl methacrylate |  |  |  |  |  |  | 152.9 g |  |  |  |
|  | tetrahydrofurfuryl methacrylate |  |  |  |  |  |  |  |  | 117.1 g |  |
|  | vinyl neononanoate |  |  |  | 78.3 g |  |  |  |  |  | 78.3 g |
|  | vinyl neodecanoate |  | 84.3 g |  |  |  |  |  | 84.3 g |  |  |
|  | vinyl neoundecanoate |  |  |  |  |  | 90.3 g |  |  |  |  |

TABLE 3-continued

|  |  | 21 | 22 | 23 | 24 | 25 | 26 | 27 | 28 | 29 | 30 |
|---|---|---|---|---|---|---|---|---|---|---|---|
| Monomer B | 1-vinylimidazole |  |  |  |  | 64.7 g |  | 64.7 g |  |  |  |
|  | styrene | 71.6 g | 41.6 g |  | 41.6 g |  |  |  |  |  | 41.6 g |
|  | benzyl methacrylate |  |  |  |  |  | 70.4 g |  | 70.4 g |  |  |
|  | phenethyl methacrylate |  |  | 130.8 g |  |  |  |  |  |  |  |
|  | 2-phenoxyethyl methacrylate |  |  |  |  |  |  |  |  | 141.8 g |  |
| Monomer A | polyglcyol 8 |  | 300 g |  |  | 300 g |  |  | 300 g |  |  |
|  | polyglycol 9 | 429 g |  |  | 429 g |  |  |  |  | 429 g |  |
|  | polyglycol 10 |  |  | 876 g |  |  |  | 876 g |  |  |  |
|  | polyglycol 11 |  |  |  |  |  | 1224 g |  |  |  | 1224 g |
| Initiator | AMBN | 16.5 g | 13.4 g |  | 13.4 g | 16.5 g | 13.4 g |  | 13.4 g |  |  |
|  | dibenzoyl peroxide |  |  | 20.8 g |  |  |  | 20.8 g |  |  |  |
|  | ascorbic acid/t-BuOOH |  |  |  |  |  |  |  |  | 17.51 g/ 7.73 g | 17.51 g/ 7.73 g |
| Regulator | dodecanethiol | 16.5 g | 13.4 g |  |  | 16.5 g |  |  |  | 16.5 g |  |
|  | ethyl mercaptan |  |  |  | 4.2 g |  |  |  | 4.2 g |  |  |
| Solvent | methyl ethyl ketone | 660 g | 660 g |  |  | 660 g | 660 g |  |  |  |  |
|  | methyl isobutyl ketone |  |  | 660 g | 660 g |  |  | 660 g | 660 g |  |  |
|  | isopropanol |  |  |  |  |  |  |  |  | 660 g | 660 g |
|  | to synthesis prescription . . . | 1 | 1 | 1 | 1 | 1 | 1 | 1 | 1 | 2 | 2 |
|  | $M_w$ of polymer obtained | 8400 | 7900 | 13900 | 9000 | 8100 | 26200 | 15000 | 8600 | 8900 | 24800 |

Monomer A of tables 1 to 3:

Polyglycol 1 polyalkylene glycol monovinyl ether (formula (I), k=0, n=0, m=11.5; (A-O) is (CH$_2$CH$_2$O)), molar mass about 550 g/mol Polyglycol 2 polyalkylene glycol monovinyl ether (formula (I), k=0, n=0, m=24; (A-O) is (CH$_2$CH$_2$O)), molar mass about 1100 g/mol Polyglycol 3 polyalkylene glycol monovinyl ether (formula (I), k=0, n=0, m=44.5; (A-O) is (CH$_2$CH$_2$O)), molar mass about 2000 g/mol Polyglycol 4 polyalkylene glycol monovinyl ether (formula (I), k=0, n=0, m=135.4; (A-O) is (CH$_2$CH$_2$O)), molar mass about 6000 g/mol Polyglycol 5 polyalkylene glycol monoallyl ether (formula (I), k=1, n=0, m=6.6; (A-O) is (CH$_2$CH$_2$O)), molar mass about 350 g/mol Polyglycol 6 polyalkylene glycol monoallyl ether (formula (I), k=1, n=0, m=10; (A-O) is (CH$_2$CH$_2$O)), molar mass about 500 g/mol Polyglycol 7 polyalkylene glycol monoallyl ether (formula (I), k=1, n=0, m=21.4; (A-O) is (CH$_2$CH$_2$O)), molar mass about 1000 g/mol Polyglycol 8 polyalkylene glycol monoallyl ether (formula (I), k=1, ethylene oxide/propylene oxide 6:4 (random polymer), molar mass about 500 g/mol Polyglycol 9 polyalkylene glycol monoallyl ether (formula (I), k=1, ethylene oxide (B—O)/propylene oxide (A-O) 11:4 (block copolymer), molar mass about 750 g/mol Polyglycol 10 polyalkylene glycol monoallyl ether (formula (I), k=1, ethylene oxide (B—O)/propylene oxide (A-O) 20:10 (block copolymer), molar mass about 1500 g/mol Polyglycol 11 polyalkylene glycol monoallyl ether (formula (I), k=1, ethylene oxide/propylene oxide 20:20 (random polymer), molar mass about 2100 g/mol Production of a Pigment Preparation:

The pigment, in the form alternatively of powder, granulate or presscake, was pasted up in deionized water together with the dispersants and the other adjuvants and then homogenized and predispersed using a dissolver (for example from VMA-Getzmann GmbH, type AE3-M1) or some other suitable apparatus. Fine dispersion was subsequently effected using a bead mill (for example AE3-M1 from VMA-Getzmann) or else some other suitable dispersing assembly, with milling being carried out with siliquartzite beads or zirconium mixed oxide beads of size d=1 mm, accompanied by cooling, until the desired color strength and coloristics were obtained. Thereafter, the dispersion was adjusted with deionized water to the desired final pigment concentration, the grinding media separated off and the pigment preparation isolated.

Evaluation of a Pigment Preparation

Color strength and hue were determined in accordance with DIN 55986. The rub-out test was carried out by applying the emulsion paint or the varnish, after mixing with the pigment dispersion, to a paint card. Subsequently, the applied coating was rubbed with the finger on the lower part of the paint card. Incompatibility was present if the rubbed area is then more strongly or brightly colored than the adjacent area not aftertreated (the rub-out test is described in DE 2 638 946). Color strength and compatibilities with the medium to be colored was determined using 5 different white dispersions:

1. white dispersion A (for exteriors, waterborne, 20% TiO$_2$)
2. white dispersion B (for exteriors, waterborne, 13.4% TiO$_2$)
3. white dispersion C (for exteriors, waterborne, polysiloxane emulsion as binder, TiO$_2$, talc, calcium carbonate)
4. white dispersion D (for interiors, waterborne, polymer dispersion, free of solvent and plasticizers, low emission, TiO$_2$, calcium carbonate)
5. white dispersion E (for interiors, waterborne, polyacrylates, TiO$_2$, calcium carbonate)

Viscosity was determined using a cone-and-plate viscometer (Roto Visco 1) from Haake at 20° C. (titanium cone: Ø 60 mm, 1°), the relationship between viscosity and shear rate in a range between 0 and 200 s$^{-1}$ being investigated. Viscosities were measured at a shear rate of 60 s$^{-1}$.

To evaluate the storage stability of the dispersions, viscosity was measured directly after production of the preparation and also after four weeks' storage at 50° C.

Shear stability and foam behavior were observed after shearing a formulation, diluted to 2%, with a commercially available kitchen blender (Braun MX 32) set to a high speed of rotation. The higher the sheer stability of the formulation, the lower the loss of color strength after shearing in a color strength comparison between a sheared versus an unsheared dispersion. Foam behavior was observed after the blender had been turned off.

The pigment preparations described in the examples which follow were produced by the method described above, the following constituents being used in the stated amounts such that 100 parts of the respective pigment preparation are formed. Parts are by weight in the examples below. It is composed of the following general formulation:

X parts of component (A), Pigment
Y parts of component (B), dispersant as per formula (I), (II), (III) or (IV), the no. of the synthesis example is indicated in the table
1 part of component (C), lauryl sulfate
9 parts of component (E), propylene glycol
0.2 part of component (F), preservative
Balance component (G), water The respective fractions of X and Y are reported in the tables which follow.

FS=color strength, comp.=component, P=pigment.

| Pigment formulation No. | Composition | Test results for white dispersion A | Test results for white dispersion B | Test results for white dispersion C | Test results for white dispersion D |
|---|---|---|---|---|---|
| 1 | 50 parts P. Blue 15 (Comp. A); 8 parts Comp. B from synthesis example 9 | FS 101% no rub-out, no flocculation | FS 105% no rub-out, no flocculation | FS 100% no rub-out, no flocculation | FS 107% no rub-out, no flocculation |
| 2 | 40 parts P. Black 7 (Comp. A); 6 parts Comp. B from synthesis example 2 | FS 99% slight rub-out, minimal flocculation | FS 100% no rub-out, no flocculation | FS 106% no rub-out, no flocculation | FS 100% slight rub-out, no flocculation |
| 3 | 42 parts P. Red 12 (Comp. A); 8 parts Comp. B from synthesis example 19 | FS 103% no rub-out, no flocculation | FS 103% no rub-out, minimal flocculation | FS 99% no rub-out, no flocculation | FS 105% no rub-out, no flocculation |
| 4 | 45 parts P. Green 7 (Comp. A); 8 parts Comp. B from synthesis example 16 | FS 102% no rub-out, no flocculation | FS 100% slight rub-out, no flocculation | FS 99% no rub-out, slight flocculation | FS 103% no rub-out, no flocculation |
| 5 | 50 parts P. Red 112 (Comp. A); 8 parts Comp. B from synthesis example 26 | FS 99% no rub-out, no flocculation | FS 95% no rub-out, no flocculation | FS 105% no rub-out, no flocculation | FS 101% no rub-out, no flocculation |
| 6 | 40 parts P. Red 168 (Comp. A); 9 parts Comp. B from synthesis example 5 | FS 102% no rub-out, no flocculation | FS 103% slight rub-out, no flocculation | FS 102% no rub-out, no flocculation | FS 104% minimal rub-out, no flocculation |
| 7 | 50 parts P. Yellow 1 (Comp. A); 10 parts Comp. B from synthesis example 13 | FS 100% no rub-out, no flocculation | FS 100% no rub-out, minimal flocculation | FS 102% no rub-out, no flocculation | FS 101% no rub-out, no flocculation |
| 8 | 40 parts P. Yellow 83 (Comp. A); 7 parts Comp. B from synthesis example 22 | FS 95% no rub-out, no flocculation | FS 98% no rub-out, no flocculation | FS 98% no rub-out, no flocculation | FS 102% no rub-out, no flocculation |
| 9 | 45 parts P. Blue 15:1 (Comp. A); 6 parts Comp. B from synthesis example 30 | FS 104% no rub-out, no flocculation | FS 100% no rub-out, no flocculation | FS 103% no rub-out, no flocculation | FS 102% no rub-out, no flocculation.0 |
| 10 | 40 parts P. Red 5 (Comp. A); 8 parts Comp. B from synthesis example 15 | FS 99% no rub-out, no flocculation | FS 94% no rub-out, no flocculation | FS 103% no rub-out, no flocculation | FS 107% minimal rub-out, no flocculation |
| 11 | 65 parts P. White 6 (Comp. A); 8 parts Comp. B from synthesis example 1 | 103% relative whitening power in black emulsion paint | — | — | — |
| 12 | 47 parts P. Blue 15:3 (Comp. A); 7.5 parts Comp. B from synthesis example 12 | FS 100% no rub-out, no flocculation | FS 100% no rub-out, no flocculation | FS 100% no rub-out, no flocculation | FS 102% no rub-out, no flocculation |
| 13 | 40 parts P. Orange 36 (Comp. A); 8 parts Comp. B from synthesis example 21 | FS 105% no rub-out, no flocculation | FS 100% no rub-out, no flocculation | FS 105% no rub-out, no flocculation | FS 101% no rub-out, no flocculation |
| 14 | 38 parts P. Red 122 (Comp. A); 11 parts Comp. B from synthesis example 16 | FS 108% no rub-out, no flocculation | FS 105% no rub-out, no flocculation | FS 102% no rub-out, no flocculation | FS 105% no rub-out, no flocculation |
| 15 | 50 parts P. Red 3 (Comp. A); 10 parts Comp. B from synthesis example 28 | FS 98% no rub-out, no flocculation | FS 99% no rub-out, no flocculation | FS 89% no rub-out, no flocculation | FS 100% no rub-out, no flocculation |

| | | | | | |
|---|---|---|---|---|---|
| 16 | 35 parts P. Violet 19 (Comp. A); 7 parts Comp. B from synthesis example 24 | FS 104% no rub-out, no flocculation | FS 102% no rub-out, no flocculation | FS 102% no rub-out, no flocculation | FS 100% no rub-out, no flocculation |
| 17 | 50 parts P. Red 254 (Comp. A); 8 parts Comp. B from synthesis example 3 | FS 101% no rub-out, no flocculation | FS 100% no rub-out, no flocculation | FS 102% no rub-out, no flocculation | FS 104% no rub-out, minimal flocculation |
| 18 | 45 parts P. Orange 5 (Comp. A); 12 parts Comp. B from synthesis example 29 | FS 100% no rub-out, no flocculation | FS 102% no rub-out, no flocculation | FS 105% minimal rub-out, no flocculation | FS 101% no rub-out, minimal flocculation |
| 19 | 48 parts P. Red 9 (Comp. A); 7 parts Comp. B from synthesis example 17 | FS 98% no rub-out, no flocculation | FS 102% no rub-out, no flocculation | FS 100% no rub-out, no flocculation | FS 105% no rub-out, minimal flocculation |
| 20 | 40 parts P. Red 188 (Comp. A); 10.5 parts Comp. B from synthesis example 14 | FS 103% no rub-out, no flocculation | FS 100% no rub-out, no flocculation | FS 102% no rub-out, no flocculation | FS 108% minimal rub-out, no flocculation |
| 21 | 36 parts P. Violet 23 (Comp. A); 12 parts Comp. B from synthesis example 23 | FS 95% no rub-out, no flocculation | FS 96% no rub-out, no flocculation | FS 99% minimal rub-out, no flocculation | FS 94% no rub-out, no flocculation |
| 22 | 50 parts P. Yellow 74 (Comp. A); 9 parts Comp. B from synthesis example 27 | FS 102% no rub-out, no flocculation | FS 107% slight rub-out, no flocculation | FS 101% no rub-out, no flocculation | FS 102% no rub-out, no flocculation |
| 23 | 48 parts P. Yellow 97 (Comp. A); 10 parts Comp. B from synthesis example 20 | FS 100% no rub-out, no flocculation | FS 101% no rub-out, no flocculation | FS 103% no rub-out, no flocculation | FS 101% no rub-out, no flocculation |
| 24 | 40 parts P. Yellow 154 (Comp. A); 10 parts Comp. B from synthesis example 25 | FS 106% no rub-out, no flocculation | FS 100% slight rub-out, no flocculation | FS 101% no rub-out, no flocculation | FS 98% no rub-out, no flocculation |
| 25 | 45 parts P. Yellow 16 (Comp. A); 12 parts Comp. B from synthesis example 10 | FS 99% no rub-out, no flocculation | FS 102% no rub-out, minimal flocculation | FS 106% no rub-out, no flocculation | FS 100% no rub-out, no flocculation |
| 26 | 42 parts P. Red 170 (Comp. A); 10 parts Comp. B from synthesis example 6 | FS 101% no rub-out, no flocculation | FS 102% no rub-out, no flocculation | FS 102% no rub-out, no flocculation | FS 102% no rub-out, no flocculation |
| 27 | 45 parts P. Red 184 (Comp. A); 8 parts Comp. B from synthesis example 4 | FS 100% no rub-out, no flocculation | FS 100% no rub-out, no flocculation | FS 100% no rub-out, minimal flocculation | FS 100% minimal rub-out, no flocculation |
| 28 | 40 parts P. Red 188 (Comp. A); 12 parts Comp. B from synthesis example 11 | FS 106% no rub-out, no flocculation | FS 100% no rub-out, no flocculation | FS 95% slight rub-out, no flocculation | FS 99% no rub-out, no flocculation |
| 29 | 41 parts P. Violet 32 (Comp. A); 7 parts Comp. B from synthesis example 18 | FS 103% no rub-out, no flocculation | FS 104% no rub-out, no flocculation | FS 105% no rub-out, no flocculation | FS 102% no rub-out, no flocculation |
| 30 | 40 parts P. Brown 25 (Comp. A); 8 parts Comp. B from synthesis example 7 | FS 99% no rub-out, no flocculation | FS 98% no rub-out, no flocculation | FS 99% no rub-out, no flocculation | FS 105% no rub-out, no flocculation |
| 31 | 42 parts P. Brown 41 (Comp. A); 9 parts Comp. B from synthesis example 8 | FS 100% no rub-out, no flocculation | FS 100% no rub-out, slight flocculation | FS 103% no rub-out, no flocculation | FS 104% minimal rub-out, no flocculation |
| 32 | 45 parts P. Red 208 (Comp. A); 10 parts Comp. B from synthesis example 24 | FS 108% some rub-out, minimal flocculation | FS 106% no rub-out, no flocculation | FS 102% no rub-out, no flocculation | FS 106% no rub-out, no flocculation |
| 33 | 38 parts P. Yellow 151 (Comp. A); 10 parts Comp. B from synthesis example 1 | FS 100% no rub-out, no flocculation | FS 102% no rub-out, minimal flocculation | FS 101% no rub-out, no flocculation | FS 105% minimal rub-out, no flocculation |
| 34 | 40 parts P. Black 11 (Comp. A); 5 parts Comp. B from synthesis example 16 | FS 102% no rub-out, no flocculation | FS 102% no rub-out, no flocculation | FS 103% no rub-out, no flocculation | FS 104% no rub-out, no flocculation |
| 35 | 65 parts P. Blue 28 (Comp. A); 5 parts Comp. B from synthesis example 17 | FS 99% no rub-out, no flocculation | FS 97% rub-out, no flocculation | FS 98% no rub-out, no flocculation | FS 99% no rub-out, no flocculation |

-continued

| | | | | | |
|---|---|---|---|---|---|
| 36 | 50 parts P. Green 50 (Comp. A); 6 parts Comp. B from synthesis example 20 | FS 100% no rub-out, no flocculation | FS 101% no rub-out, no flocculation | FS 100% no rub-out, no flocculation | FS 104% no rub-out, no flocculation |
| 37 | 75 parts P. Green 17 (Comp. A); 5 parts Comp. B from synthesis example 12 | FS 100% no rub-out, no flocculation | FS 102% no rub-out, no flocculation | FS 102% no rub-out, no flocculation | FS 96% no rub-out, no flocculation |
| 38 | 70 parts P. Red 101 (Comp. A); 5 parts Comp. B from synthesis example 29 | FS 100% no rub-out, no flocculation | FS 102% no rub-out, no flocculation | FS 103% no rub-out, no flocculation | FS 102% minimal rub-out, no flocculation |
| 39 | 65 parts P. Yellow 184 (Comp. A); 8 parts Comp. B from synthesis example 13 | FS 98% no rub-out, no flocculation | FS 102% no rub-out, no flocculation | FS 105% no rub-out, no flocculation | FS 99% minimal rub-out, no flocculation |

| Pigment formulation No. | Test results for white dispersion E | Shear stability | Foam behavior | As-prepared viscosity | Storage stability |
|---|---|---|---|---|---|
| 1 | FS 100% no rub-out, no flocculation | very good | no significant foam observed | 573 mPas | very good |
| 2 | FS 98% no rub-out, no flocculation | very good | no significant foam observed | 346 mPas | good |
| 3 | FS 101% no rub-out, no flocculation | good | no significant foam observed | 610 mPas | very good |
| 4 | FS 100% no rub-out, no flocculation | very good | no significant foam observed | 492 mPas | very good |
| 5 | FS 105% no rub-out, no flocculation | very good | slight foaming observed | 344 mPas | very good |
| 6 | FS 103% no rub-out, no flocculation | very good | no significant foam observed | 407 mPas | good |
| 7 | FS 97% no rub-out, no flocculation | very good | no significant foam observed | 264 mPas | very good |
| 8 | FS 98% no rub-out, no flocculation | good | slight foaming observed | 224 mPas | very good |
| 9 | FS 102% no rub-out, minimal flocculation | very good | no significant foam observed | 205 mPas | very good |
| 10 | FS 99% no rub-out, no flocculation | good | a few foam bubbles observed | 658 mPas | good enough |
| 11 | — | very good | no significant foam observed | 1494 mPas | very good |
| 12 | FS 100% no rub-out, no flocculation | very good | no significant foam observed | 210 mPas | very good |
| 13 | FS 101% no rub-out, no flocculation | very good | no significant foam observed | 680 mPas | very good |
| 14 | FS 108% no rub-out, no flocculation | good | no significant foam observed | 641 mPas | very good |
| 15 | FS 96% no rub-out, no flocculation | good enough | slight foaming observed | 224 mPas | very good |

-continued

| | | | | | |
|---|---|---|---|---|---|
| 16 | FS 99% no rub-out, no flocculation | very good | no significant foam observed | 910 mPas | very good |
| 17 | FS 102% no rub-out, no flocculation | very good | no significant foam observed | 509 mPas | very good |
| 18 | FS 96% no rub-out, no flocculation | very good | no significant foam observed | 750 mPas | very good |
| 19 | FS 99% no rub-out, no flocculation | very good | no significant foam observed | 381 mPas | very good |
| 20 | FS 103% no rub-out, no flocculation | very good | no significant foam observed | 600 mPas | very good |
| 21 | FS 95% no rub-out, no flocculation | very good | no significant foam observed | 163 mPas | very good |
| 22 | FS 101% no rub-out, no flocculation | good | slight foaming observed | 308 mPas | very good |
| 23 | FS 96% no rub-out, no flocculation | very good | no significant foam observed | 461 mPas | very good |
| 24 | FS 99% no rub-out, no flocculation | very good | no significant foam observed | 540 mPas | good |
| 25 | FS 97% no rub-out, no flocculation | very good | no significant foam observed | 434 mPas | very good |
| 26 | FS 99% no rub-out, no flocculation | very good | no significant foam observed | 807 mPas | good |
| 27 | FS 105% no rub-out, no flocculation | very good | no significant foam observed | 367 mPas | very good |
| 28 | FS 104% no rub-out, no flocculation | good | no significant foam observed | 679 mPas | very good |
| 29 | FS 99% no rub-out, no flocculation | good | no significant foam observed | 600 mPas | good |
| 30 | FS 103% no rub-out, no flocculation | very good | no significant foam observed | 604 mPas | very good |
| 31 | FS 102% no rub-out, no flocculation | very good | no significant foam observed | 499 mPas | very good |
| 32 | FS 95% no rub-out, no flocculation | very good | no significant foam observed | 816 mPas | very good |
| 33 | FS 102% no rub-out, no flocculation | very good | no significant foam observed | 260 mPas | very good |
| 34 | FS 105% no rub-out, no flocculation | very good | no significant foam observed | 1588 mPas | very good |
| 35 | FS 102% no rub-out, no flocculation | good | no significant foam observed | 1890 mPas | very good |

| | | | | | |
|---|---|---|---|---|---|
| 36 | FS 100% no rub-out, no flocculation | very good | slight foam observed | 2347 mPas | very good |
| 37 | FS 99% no rub-out, no flocculation | very good | no significant foam observed | 2108 mPas | very good |
| 38 | FS 101% no rub-out, no flocculation | very good | no significant foam observed | 1764 mPas | very good |
| 39 | FS 106% no rub-out, no flocculation | good | no significant foam observed | 2590 mPas | very good |

What is claimed is:

1. An aqueous pigment preparation comprising
(A) at least one organic pigment, an inorganic pigment or a mixture thereof,
(B) a dispersant of formula (I), (II), (III) or (IV) or mixtures of dispersants of formulae (I), (II), (III) or (IV)

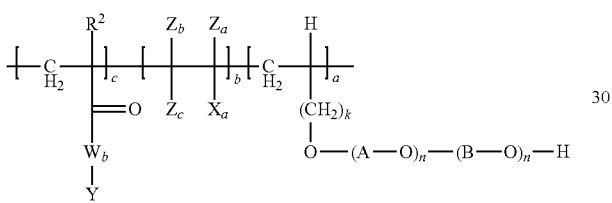
(I)

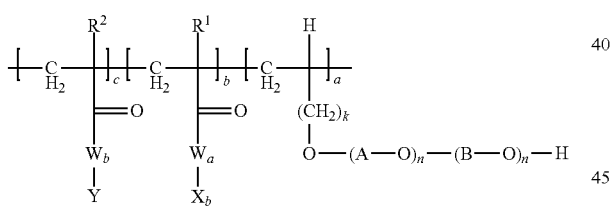
(II)

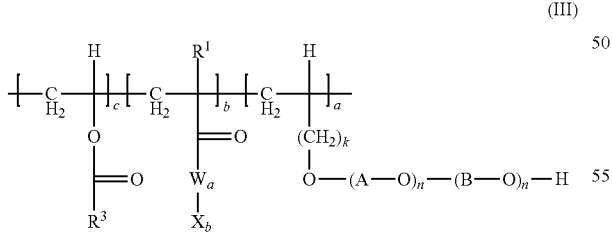
(III)

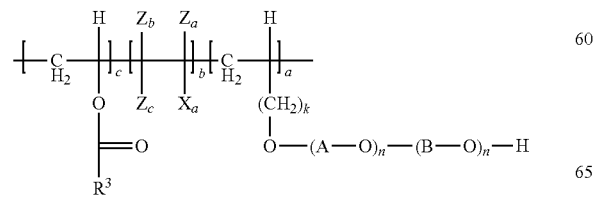
(IV)

wherein the indices a, b and c are the molar fraction of the respective monomers:
a=0.01 to 0.8;
b=0.001 to 0.8;
c=0.001 to 0.8;
provided the sum total of a+b+c is 1,
A is $C_2$- to $C_4$-alkylene and
B is a $C_2$- to $C_4$-alkylene other than A,
k equals 0 or 1,
m is from 0 to 500;
n is from 0 to 500,
provided the sum total of m+n is from 1 to 1000;
XA is an aromatic or araliphatic radical having 3 to 30 carbon atoms optionally containing one or more of the hetero atoms N, O and S,
ZA is H or $(C_1$-$C_4)$-alkyl,
ZB is H or $(C_1$-$C_4)$-alkyl,
ZC is H or $(C_1$-$C_4)$-alkyl;
$R^1$ is hydrogen or methyl,
XB is an aromatic or araliphatic radical having 3 to 30 carbon atoms optionally containing one or more of the hetero atoms N, O and S,
WA is oxygen or an NH group,
$R^2$ is hydrogen or methyl,
Y is an aliphatic hydrocarbyl radical having 1 to 30 carbon atoms, which is optionally linear or branched or else cyclic, and optionally contains hetero atoms O, N, S or a mixture thereof and optionally unsaturated,
WB is oxygen or an NH group;
(C) optionally wetters,
(D) optionally at least one surfactant, at least one dispersant or a mixture thereof,
(E) optionally one or more organic solvents, one or more hydrotropic substances or a mixture thereof,
(F) optionally further additive materials customary for preparing aqueous pigment dispersions, and
(G) water.

2. The pigment preparation as claimed in claim 1, comprising 5% to 80% by weight of said component (A).

3. The pigment preparation as claimed in claim 1, comprising 0.1% to 30% by weight of said component (B).

4. The pigment preparation as claimed in claim 1, having the following composition of said components (A) to (G):
(A) 5% to 80% by weight,
(B) 0.1% to 30% by weight,
(C) 0% to 10% by weight,
(D) 0% to 20% by weight,
(E) 0% to 30% by weight,
(F) 0% to 20% by weight,
(G) 1% to 90% by weight of water,
all based on the total weight of said pigment preparation.

5. The pigment preparation as claimed in claim 1, having the following composition of said components (A) to (G):
(A) 10% to 70% by weight,
(B) 2% to 15% by weight,
(C) 0.1% to 5% by weight,
(D) 1% to 10% by weight,
(E) 5% to 20% by weight,
(F) 0.1% to 5% by weight,
(G) 10% to 70% by weight of water,
all based on the total weight of said pigment preparation.

6. The pigment preparation as claimed in claim 1, wherein the organic pigment of said component (A) is a monoazo, disazo, laked azo, β-naphthol, Naphthol AS, benzimidazolone, disazo condensation, azo metal complex pigment or a polycyclic pigment selected from the group consisting of phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments or carbon blacks.

7. The pigment preparation as claimed in claim 1, wherein the alkylene oxide units $(A-O)_m$ and $(B-O)_n$ are arranged in blocks in said component (B).

8. A process for producing a pigment preparation as claimed in claim 1, comprising the steps of dispersing said component (A) in the form of powder, granulate or aqueous presscake in the presence of water (G) and also said components (B) and optionally (C) and (D), optionally admixing water (G), optionally one or more of said components (E) and (F) and optionally diluting the resulting aqueous pigment dispersion with water (G); or precharging said components (B) and optionally mixing and homogenizing one or more of said components (C), (D), (E) and (F) to form a precharged mixture, stirring said component (A) into the precharged mixture, said component (A) being incipiently pasted and predispersed.

9. A natural or synthetic material pigmented by a pigment preparation as claimed in claim 1.

10. A pigmented aqueous paint, dispersion color varnish color, water-thinnable varnish, wallpaper color or printing color pigmented by the pigment preparation as claimed in claim 1.

11. A pigmented composition pigmented by a pigment preparation as claimed in claim 1, wherein the pigmented composition is in a form selected from the group consisting of natural fiber materials, synthetic fiber materials, cellulose fibers, paper pulp, laminate, printing inks, ink-jet inks, electrophotographic toners, powder coatings, color filters, electronic inks electronic paper, color filters, wood preservation systems, viscose dope dyeing, sausage casings, seed, fertilizers, glass bottles, roof shingles, renders, concrete, wood stains, colored pencil leads, felt tip pens, waxes, paraffins, graphics inks, ballpoint pen pastes, chalks, washing compositions, cleaning compositions, shoe care agents, latex products, abrasives, plastics.

12. The pigment preparation as claimed in claim 1, the aliphatic hydrocarbyl radical has 6 to 30 carbon atoms.

13. The pigment preparation as claimed in claim 1, wherein the aliphatic hydrocarbyl radical has 9 to 20 carbon atoms.

* * * * *